United States Patent
Pawelski

[19]

[11] Patent Number: 6,119,579
[45] Date of Patent: Sep. 19, 2000

[54] APPARATUS AND METHOD FOR DETECTING PISTON LOCATION WITHIN A FLUID CYLINDER OF A WORK MACHINE

[75] Inventor: Paul C. Pawelski, Cary, N.C.

[73] Assignee: Caterpillar Inc., Peoria, Ill.

[21] Appl. No.: 09/044,891

[22] Filed: Mar. 20, 1998

[51] Int. Cl.[7] .................................................. F01B 31/12
[52] U.S. Cl. .......................................................... 92/5 R
[58] Field of Search ..................... 91/1; 92/5 R; 414/701

[56] References Cited

U.S. PATENT DOCUMENTS

| | | | |
|---|---|---|---|
| 4,037,519 | 7/1977 | Miller et al. ................................... | 91/1 |
| 4,148,481 | 4/1979 | Smith-Vaniz ................................ | 273/54 |
| 4,452,074 | 6/1984 | Shelomentsev et al. . | |
| 4,543,649 | 9/1985 | Head et al. ................................. | 367/99 |
| 4,606,015 | 8/1986 | Yamaguchi ................................ | 367/99 |
| 4,711,120 | 12/1987 | Kwun et al. . | |
| 4,936,143 | 6/1990 | Schutten et al. . | |
| 4,938,054 | 7/1990 | Dye et al. ................................. | 73/1.21 |
| 5,182,979 | 2/1993 | Morgan . | |
| 5,231,352 | 7/1993 | Huber ........................................ | 92/5 R |

Primary Examiner—F. Daniel Lopez
Attorney, Agent, or Firm—Maginot, Addison & Moore

[57] ABSTRACT

A fluid cylinder assembly for a work machine includes a fluid cylinder having a housing which includes a first end wall, a second end wall, and a cylindrical side wall which collectively cooperate so as to define a piston chamber. The fluid cylinder also includes a piston housed for translation within the piston chamber, and a rod which extends through an opening defined in the second end wall. An ultrasonic transducer is secured to the cylindrical side wall of the fluid cylinder for transmitting ultrasonic vibrations into the piston chamber during a first time period and receiving ultrasonic vibrations from the piston chamber during a second time period. A control circuit is operatively coupled to the transducer. The control circuit generates a trigger signal which causes the transducer to transmit the ultrasonic vibrations during the first time period. The control circuit analyzes returned energy or echoes from within the piston chamber in order to determine piston location within the piston chamber. The output from the control circuit may be used to selectively disengage an "automatic lift" feature of a hydraulic lever assembly.

18 Claims, 4 Drawing Sheets

APPARATUS AND METHOD FOR DETECTING PISTON LOCATION WITHIN A FLUID CYLINDER OF A WORK MACHINE

TECHNICAL FIELD OF THE INVENTION

The present invention relates generally to a fluid cylinder of a work machine, and more particularly to an apparatus and method for detecting piston location within a fluid cylinder of a work machine.

BACKGROUND OF THE INVENTION

Work machines, such as wheel loaders, excavators, and bulldozers, typically include a number of fluid cylinders such as hydraulic cylinders. Such hydraulic cylinders provide the motive power for moving components associated with the work machine relative to one another. For example, hydraulic cylinders may be used to move the lift arm of a wheel loader relative to the chassis.

Hydraulic cylinders typically include a housing having a piston which translates therein. A first end of a rod is secured to the piston and is extended out of and retracted into the housing as the piston is translated by changes in hydraulic fluid volume within the housing. It should be appreciated that a second end of the rod is secured to a component associated with the work machine so as to exert a motive force thereon. For example, the second end of the rod may be coupled to the lift arm of a wheel loader such that the lift arm is raised relative to the chassis of the wheel loader when the rod is extended out of the housing, and lowered relative to the chassis of the wheel loader when the rod is retracted into the housing.

In certain work machine designs, it is desirable to determine the position of the hydraulic cylinder. For example, it may be desirable to provide an "automatic lift" feature which lifts the lift arm of a wheel loader to a predetermined height and thereafter maintains the lift arm at the predetermined height. One way to determine the position of the hydraulic cylinder is to determine the location of the piston within the housing thereof. In particular, the location of the piston within the housing determines the amount of extension of the rod relative the housing which in turn determines the position of the lift arm relative to the chassis of the work machine.

Hence, a number of devices for detecting the location of the piston within the housing have heretofore been designed. Such devices typically have a number of drawbacks associated therewith. For example, such devices are generally mechanically and/or electrically complex thereby disadvantageously increasing costs associated with the work machine. Moreover, a number of such devices are disadvantageously affected by changes in both the pressure and temperature of the hydraulic fluid within the housing of the hydraulic cylinder. More specifically, a number of such devices have sensors which disadvantageously produce varying output signals as a result of changes in both the pressure and temperature of the hydraulic fluid within the housing of the hydraulic cylinder.

What is needed therefore is a method and apparatus for detecting piston location within a fluid cylinder which overcomes one or more of the aforementioned drawbacks.

DISCLOSURE OF THE INVENTION

In accordance with a first embodiment of the present invention, there is provided a fluid cylinder assembly for a work machine having a first machine component and a second machine component. The fluid cylinder assembly includes a fluid cylinder having a housing which has a first end wall, a second end wall, and a cylindrical side wall which collectively cooperate so as to define a piston chamber. The housing is secured to the first machine component. The fluid cylinder also has a piston housed for translation within the piston chamber, and a rod which extends through an opening defined in the second end wall. The rod has a first rod end which is secured to the piston, and a second rod end which is secured to the second machine component. The fluid cylinder assembly also includes an ultrasonic transducer secured to the cylindrical side wall of the fluid cylinder for transmitting ultrasonic vibrations into the piston chamber during a first time period and receiving ultrasonic vibrations from the piston chamber during a second time period. Moreover, the fluid cylinder assembly includes a circuit which is operatively coupled to the transducer. The circuit generates a trigger signal which causes the transducer to transmit the ultrasonic vibrations during the first time period, and generates a piston-located signal in response to receipt of the ultrasonic vibrations from the transducer when the piston has a predetermined physical relationship with the transducer.

In accordance with a second embodiment of the present invention, there is provided a method of detecting piston location within a fluid cylinder assembly of a work machine. The work machine has a first machine component and a second machine component. The fluid cylinder assembly has a fluid cylinder which includes a housing having a first end wall, a second end wall, and a cylindrical side wall which collectively cooperate so as to define a piston chamber. The housing is secured to the first machine component. The fluid cylinder further has a piston housed for translation within the piston chamber, and a rod which extends through an opening defined in the second end wall. The rod has a first rod end which is secured to the piston, and a second rod end which is secured to the second machine component. The method includes the step of transmitting ultrasonic vibrations into the piston chamber with an ultrasonic transducer which is secured to the cylindrical side wall of the fluid cylinder during a first time period. The method also includes the step of receiving ultrasonic vibrations from the piston chamber with the ultrasonic transducer during a second time period. The method further includes the step of generating a piston-located signal when the ultrasonic vibrations received by the ultrasonic transducer indicate that the piston has a predetermined physical relationship with the ultrasonic transducer.

In accordance with a third embodiment of the present invention, there is provided a fluid cylinder assembly for a work machine having a first machine component and a second machine component. The fluid cylinder assembly includes a fluid cylinder having a housing which has a first end wall, a second end wall, and a cylindrical side wall which collectively cooperate so as to define a piston chamber. The housing is secured to the first machine component. The fluid cylinder also has a piston housed for translation within the piston chamber, and a rod which extends through an opening defined in the second end wall. The rod has a first rod end which is secured to the piston, and a second rod end which is secured to the second machine component. The fluid cylinder assembly also includes an ultrasonic transducer secured to the cylindrical side wall of the fluid cylinder for transmitting ultrasonic vibrations into the piston chamber during a first time period and receiving ultrasonic vibrations from the piston chamber during a second time period. Moreover, the fluid cylinder assembly includes a circuit which is operatively coupled to the transducer. The circuit generates a trigger signal which causes the transducer to transmit the ultrasonic vibrations during the first time period, and generates a rod-located signal in response to receipt of the ultrasonic vibrations from the transducer when the rod has a predetermined physical relationship with the transducer.

BEST MODE FOR CARRYING OUT THE INVENTION

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1:
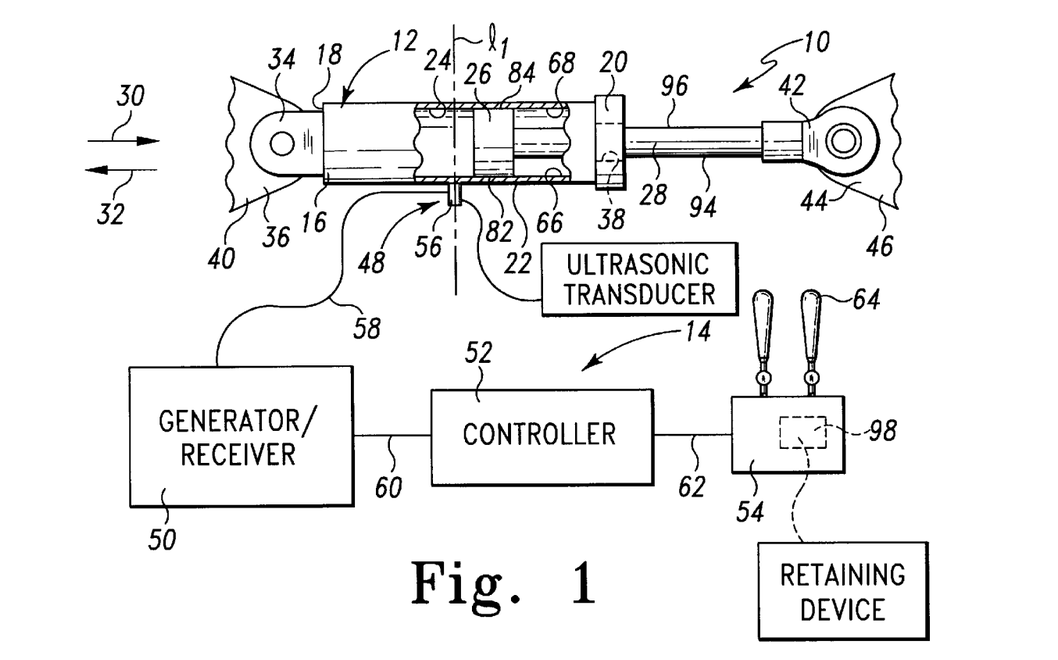
FIG. 1 is a schematic view of a fluid cylinder assembly which incorporates the features of the present invention therein.

Referring to FIG. 1, there is shown a fluid cylinder assembly 10 which includes a fluid cylinder, such as a hydraulic cylinder 12, and a control circuit 14. The hydraulic cylinder 12 includes a housing 16 having a first end wall 18, a second end wall 20, and a cylindrical side wall 22. The first end wall 18, the second end wall 20, and the cylindrical side wall 22 collectively cooperated to define a piston chamber 24.

The hydraulic cylinder 12 further includes a piston 26 and a rod 28. The piston 26 is housed for translation within the piston chamber 24 so as to cause extension and retraction of the rod 28 through an opening 38 defined in the end wall 20 of the housing 16. More specifically, a first end of the rod 28 is secured to the piston 26. Hence, as the piston 26 is translated or otherwise urged in the general direction of arrows 30, 32, the rod 28 will likewise be urged in the general direction of arrows 30, 32, respectively.

The hydraulic cylinder 12 provides the motive power for moving components associated with a work machine, such as a wheel loader (not shown), relative to one another. In particular, the end wall 18 has a mounting flange 34 which is pivotally coupled a mounting flange 36 defined in a machine component such as a chassis 40 of the work machine, whereas a second end of the rod 28 has a mounting flange 42 which is pivotally coupled to a mounting flange 44 defined in a machine component such as a lift arm 46 of the work machine.

Actuation of the hydraulic cylinder 12 causes the lift arm 46 of the work machine to be moved relative to the chassis 40. What is meant herein by the terms "actuated" or "actuation" is that the rod 28 is urged or otherwise moved relative to the housing 16. Therefore, the hydraulic cylinder 12 is actuated when the rod 28 is being extended out of, or retracted into, the housing 16. Conversely, the hydraulic cylinder 12 is deactuated or otherwise inactive if the rod 28 is not being urged or otherwise moved relative to the housing 16. It should be appreciated that when the hydraulic cylinder 16 is actuated such that the rod 28 is extended out of the housing 16, the lift arm 46 of the work machine is raised relative to the chassis 40. Conversely, when the hydraulic cylinder 16 is actuated such that the rod 28 is retracted into the housing 16, the lift arm 46 of the work machine is lowered relative to the chassis 40.

The control circuit 14 is provided to control actuation and deactuation of the hydraulic cylinder 12 and includes an ultrasonic transducer 48, a generator/receiver unit 50, a controller 52, and a lever assembly 54. The ultrasonic transducer 48 includes a single transducer device 56 which is secured to the cylindrical side wall 22. The transducer device 56 is electrically coupled to the generator/receiver unit 50 via a signal line 58. The transducer device 56 may be any one of numerous types of commercially available ultrasonic transducers such as piezoelectric transducers. One type of ultrasonic transducer which is particularly useful as the transducer device 56 of the present invention is a model 20001 5MHz Transducer, which is commercially available from StressTel Corporation of Scotts Valley, Calif.

The generator/receiver unit 50 communicates with the transducer device 56 to selectively transmit ultrasonic vibrations into the piston chamber 24. In particular, the generator/receiver unit 50 selectively generates trigger signals on the signal line 58 which are sent to the transducer device 56. The transducer device 56 converts such signals into ultrasonic vibrations which are transmitted into the piston chamber 24. Returned energy or echoes are received or otherwise collected by the transducer device 56 and thereafter converted back into electrical signals which are sent to the generator/receiver unit 50 via the signal line 58. The generator/receiver unit 50 then filters out background noise and static associated with the echoes. As shall be discussed below in more detail, the generator/receiver unit 50 digitizes selective data associated with the output of the transducer device 56 for presentation to the controller 52 via a communication line 60. The generator/receiver unit 50 may be one of numerous commercially available ultrasonic generator/receiver units which is capable of functioning in the above-described manner. One such ultrasonic generator/receiver unit which is particularly useful as the generator/receiver unit 50 of the present invention, with slight modification thereof, is a StressTel T-Scope DL generator/receiver unit which is commercially available from StressTel Corporation.

The controller 52 compares the output values from the generator/receiver unit 50 to known values in order to determine location of the piston 26 within the piston chamber 24. In particular, as will be discussed below in more detail, the controller 52 compares the output values from the generator/receiver unit 50 in order to determine if either the piston 26 or the rod 28 has a predetermined physical relationship with the transducer device 56. More specifically, the controller 52 determines if the piston 26 is aligned with the transducer device 56. What is meant herein by the term "aligned" is that a portion of the piston 26 or the rod 28 intersects an imaginary line $l_1$ which extends through the transducer device 56 and the piston chamber 24 and is positioned substantially perpendicular to the cylindrical side wall 22, as shown in FIG. 1. The controller 52 may be any type of a number of electronic control units which are commercially available. One such control unit which is particularly useful as the controller 52 of the present invention, with slight modification thereof, is a model number 126-13555 Controller which is commercially available from TRW Corporation of Cleveland, Ohio.

Figure 2:
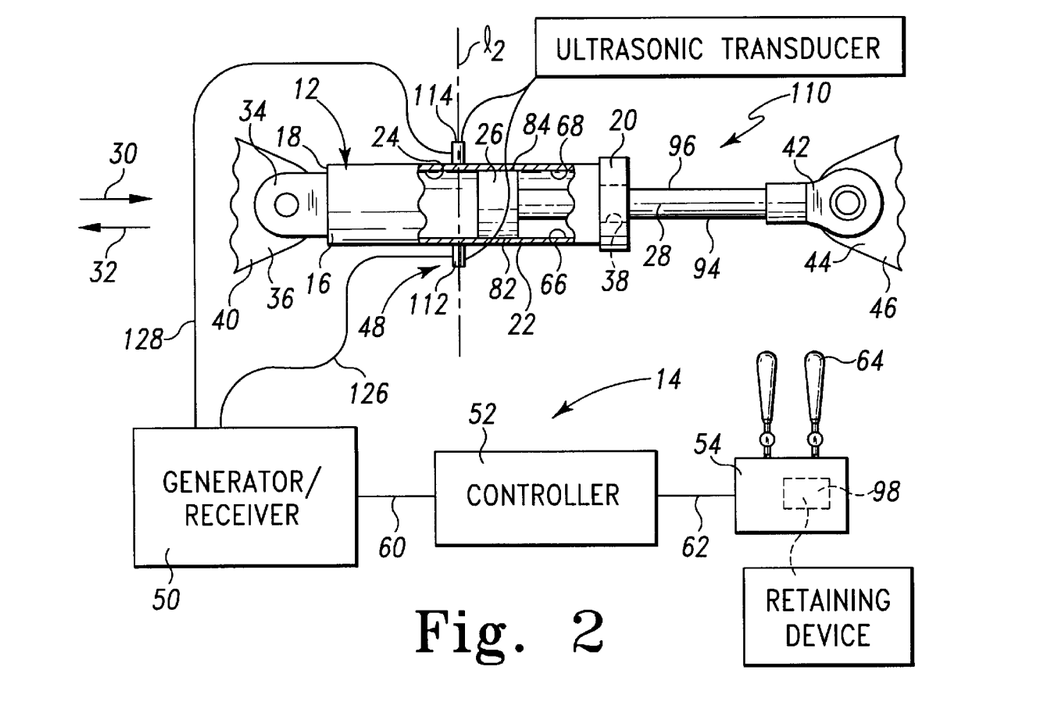
FIG. 2 is a schematic view of a second embodiment of the fluid cylinder assembly of FIG. 1.

The controller 52 is electrically coupled to the lever assembly 54 via a signal line 62. The lever assembly 54 is provided to control a number of hydraulic valves (not shown) associated with the hydraulic cylinder 12. In particular, the lever assembly 54 includes a lift lever 64 which is coupled to a number of hydraulic valves (not shown) which control the flow of hydraulic fluid into and out of the piston chamber 24 so as to cause actuation and/or deactuation of the hydraulic cylinder 12. The lift lever 64 has a retaining device such as an electromagnetic coil 98 which upon being subjected to an electrical current retains the lift lever 64 in an actuated mode of operation in which the lift lever 64 causes the hydraulic cylinder 12 to be actuated. For example, the lift lever 64 may be positioned so as to actuate the hydraulic cylinder 12 such that the lift arm 46 of the work machine is raised relative to the chassis 40. The operator of the work machine may then press a button or the like which causes a current to be applied to the electromagnetic coil 98 thereby retaining the lift lever 64 in its actuated mode of operation so as to cause continued actuation of the hydraulic cylinder 12. It should be appreciated that the lever assembly 54 may also be configured such that the electromagnetic coil 98 actuates automatically once the operator has moved the lift lever 64 beyond a predetermined distance thereby eliminating the need for the operator to press the button. As shall be discussed below in more detail, once the piston 26 reaches a predetermined location within the piston chamber 24, the controller 52 generates a piston-located control signal which is sent to the lever assembly 54 which removes the electrical current from the electromagnetic coil 98 thereby causing the lift lever 64 to be returned to its centered or neutral position (as shown in FIGS. 1 and 2) thereby placing the lift lever 64 in a deactuated mode of operation in which the hydraulic cylinder 12 is deactuated. It should be appreciated that use of a retaining device such as the electromagnetic coil 98 as described above provides an "automatic lift" feature of the lever assembly 54.

As alluded to above, the control circuit 14 transmits ultrasonic vibrations into the piston chamber 24 in order to detect the location of the piston 26. In particular, the generator/receiver unit 50 generates a trigger signal which is sent to the transducer device 56 via the signal line 58. The transducer device 56 then transmits ultrasonic vibrations or energy into the piston chamber 24. Returned energy or echoes are reflected back to the transducer device 56 at each steel/hydraulic fluid interface. In particular, each time the transmitted vibrations encounter an interface of differing densities (i.e. a steel/hydraulic fluid interface), an amount of energy is returned or echoed back to the transducer device 56. For example, the transducer device 56 detects an echo when the transmitted vibrations pass from the cylindrical side wall 22 into the hydraulic fluid within the piston chamber 24.

Figure 3:
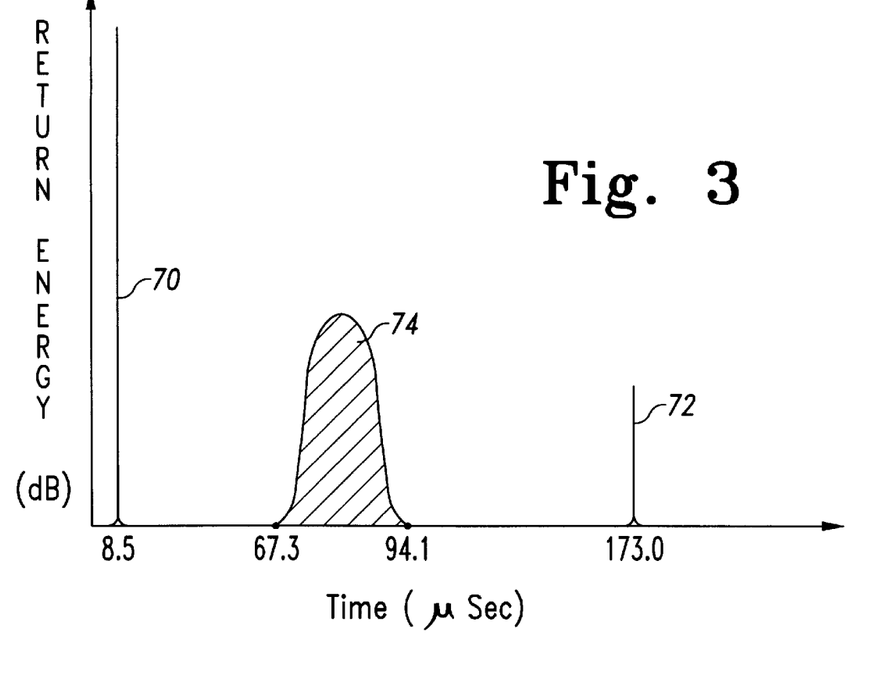
FIG. 3 is a Time versus Return Energy graph indicative of when neither the piston nor the rod of the fluid cylinder assembly of FIG. 1 is aligned with the transducer device.
Figure 4:
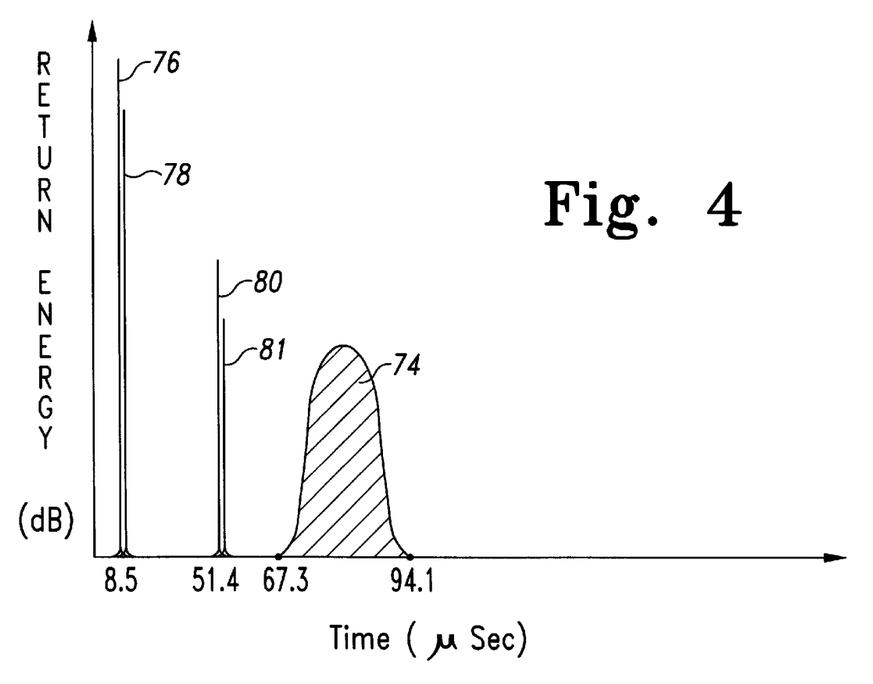
FIG. 4 is a graph similar to FIG. 3, but indicative of when the piston of the fluid cylinder assembly of FIG. 1 is aligned with the transducer device.
Figure 5:
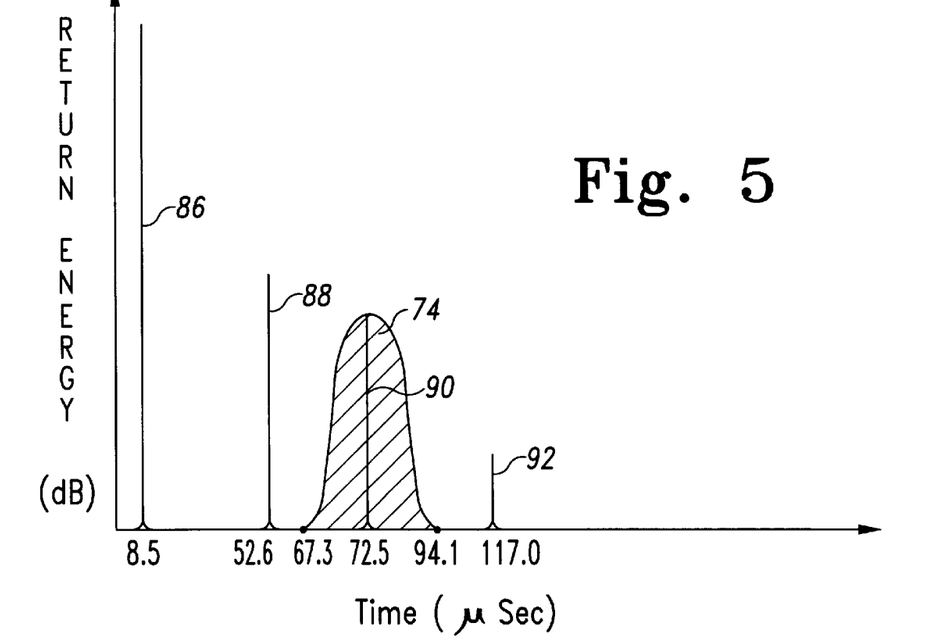
FIG. 5 is a graph similar to FIG. 3, but indicative of when the rod of the fluid cylinder assembly of FIG. 1 is aligned with the transducer device.

Hence, by monitoring the amount of time which elapses between vibration generation and energy return, commonly known as the "time of flight" of the vibration, piston location can be detected. As shown in FIGS. 3–5, a graphical representation can be created which is indicative of location of the piston 26 or the rod 28. The data in FIGS. 3–5 is indicative of return energy versus time of ultrasonic vibrations transmitted into a fluid cylinder having a side wall thickness of 21.4 mm (i.e. the cylindrical side wall 22), a bore of 107.8 mm, and a rod thickness of 50 mm (i.e. the rod 28). Note that the data is also indicative of use of SAE 10W hydraulic fluid at 150° Fahrenheit. Hence, as shown in FIG. 3, if neither the piston 26 nor the rod 22 is aligned with the transducer device 56, an echo associated with the interface between a side wall surface 66 of the cylindrical side wall 22 and the hydraulic fluid within the piston chamber 24 will be detected at a point in time 8.5 $\mu$s subsequent to vibration generation (peak 70). Moreover, an echo associated with the interface between the hydraulic fluid within the piston chamber 24 and a side wall surface 68 of the cylindrical side wall 22 is detected at a point in time 173.0 $\mu$s subsequent to vibration generation (peak 72).

It should be appreciated that echoes are also detected during a time period between 67.3 and 94.1 $\mu$s subsequent to vibration generation (curve 74). Such echoes are due to "cylinder ring" which is the transmission and return of vibrations which travel along the circumference of the cylindrical side wall 22 (as opposed to through the piston chamber 24).

As shown in FIG. 4, if the piston 26 is aligned with the transducer device 56, an echo associated with the interface between the side wall surface 66 of the cylindrical side wall 22 and a thin film of hydraulic fluid interposed between the side wall surface 66 and the piston 26 is detected at a point in time 8.5 $\mu$s subsequent to vibration generation (peak 76). An echo associated with the interface between the thin film of hydraulic fluid and a first surface 82 of the piston 26 is also detected at a point in time 8.5 $\mu$s subsequent to vibration generation (peak 78). It should be appreciated that due to the relatively small distance between the piston 26 and the side wall surface 66, the two echoes (peaks 76, 78) are detected at approximately the same point in time. An echo associated with the interface between a second surface 84 of the piston 26 and the thin film of hydraulic fluid between the piston 26 and the side wall surface 68 of the cylindrical side wall 22 is detected at a point in time 51.4 $\mu$s subsequent to vibration generation (peak 80). An echo associated with the interface between the thin film of hydraulic fluid and the side wall surface 68 of the cylindrical side wall 22 is also detected at a point in time 51.4 $\mu$s subsequent to vibration generation (peak 81). It should be appreciated that due to the relatively small distance between the piston 26 and the side wall surface 68, the two echoes (peaks 80, 81) are detected at approximately the same point in time. As described above, echoes are also detected during the time period between 67.3 and 94.1 $\mu$s subsequent to vibration generation due to cylinder ring (curve 74).

As shown in FIG. 5, if the rod 28 is aligned with the transducer device 56, an echo associated with the interface between the side wall surface 66 of the cylindrical side wall 22 and the hydraulic fluid within the piston chamber 24 will be detected at a point in time 8.5 $\mu$s subsequent to vibration generation (peak 86). In addition, an echo associated with the interface between the hydraulic fluid within the piston chamber 24 and a first surface 94 of the rod 28 is detected at a point in time 52.6 $\mu$s subsequent to vibration generation (peak 88). Moreover, an echo associated with the interface between a second surface 96 of the rod 28 and the hydraulic fluid is detected (in theory) at a point in time 72.5 μs subsequent to vibration generation (peak 90). However, as described above, echoes are also detected during the time period between 67.3 and 94.1 μs subsequent to vibration generation due to cylinder ring (curve 74). The presence of cylinder ring prevents independent detection of the echo associated with peak 90. Moreover, an echo associated with the interface between the hydraulic fluid in the piston chamber 24 and the second surface 68 of the cylindrical side wall 22 is detected at a point in time 117.0 μs subsequent to vibration generation (peak 92).

Referring now to FIG. 2, there is shown a fluid cylinder assembly 110 which is a second embodiment of the present invention. The fluid cylinder assembly 110 is somewhat similar to fluid cylinder assembly 10. Thus, the same reference numerals are used in FIG. 2 to designate common components which were previously discussed in regard to FIG. 1.

In lieu of the single transducer device 56, the ultrasonic transducer 48 of the fluid cylinder assembly 110 includes a pair of transducer devices 112, 114 secured to the cylindrical side wall 22. The transducer devices 112, 114 are electrically coupled to the generator/receiver unit 50 via a pair of signal lines 126, 128, respectively. It should be appreciated that the piston 26 or the rod 28 is "aligned" with the transducer devices 112, 114 when a portion of the piston 26 or the rod 28, respectively, intersects an imaginary line $l_2$ which extends through the transducer device 112, the transducer device 114, and the piston chamber 24 and is positioned substantially perpendicular to the cylindrical side wall 22, as shown in FIG. 2.

Figure 6:
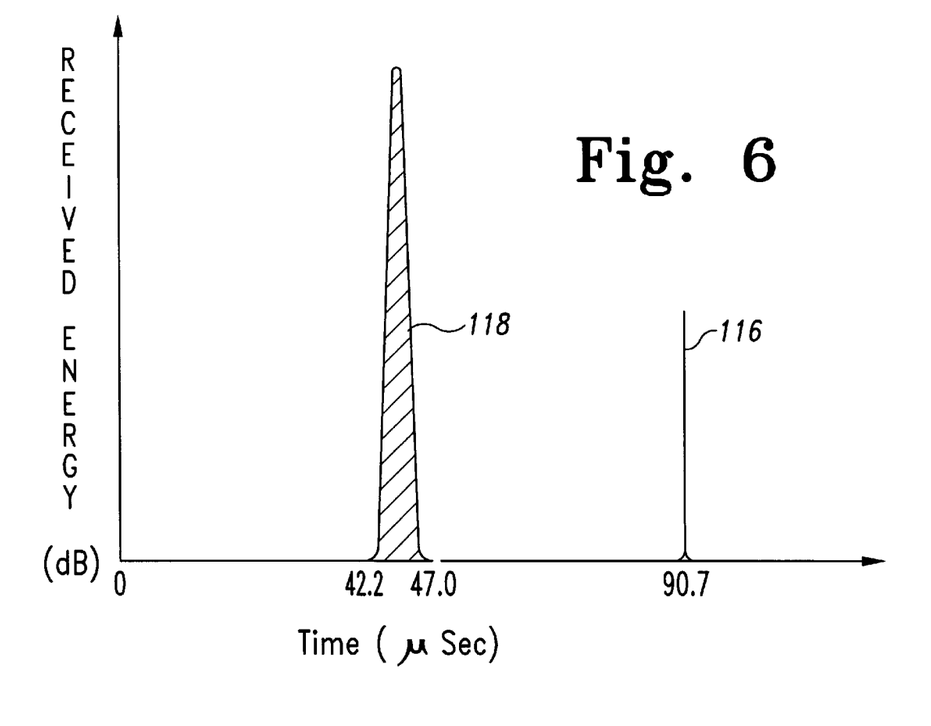
FIG. 6 is a Time vs. Energy Level graph indicative of when neither the piston nor the rod of the fluid cylinder assembly of FIG. 2 is aligned with the transducer devices.
Figure 7:
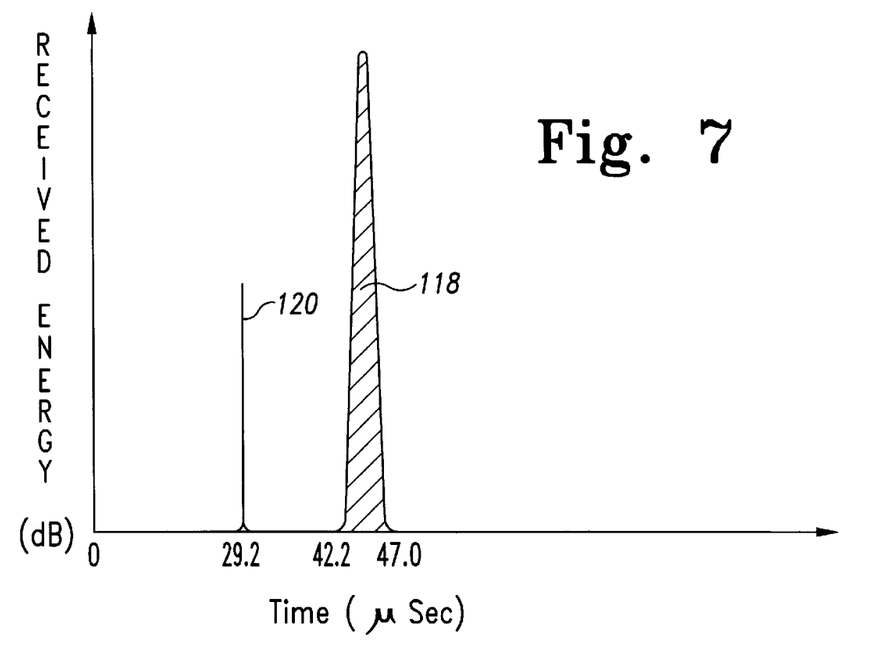
FIG. 7 is a graph similar to FIG. 6, but indicative of when the piston of the fluid cylinder assembly of FIG. 2 is aligned with the transducer devices.
Figure 8:
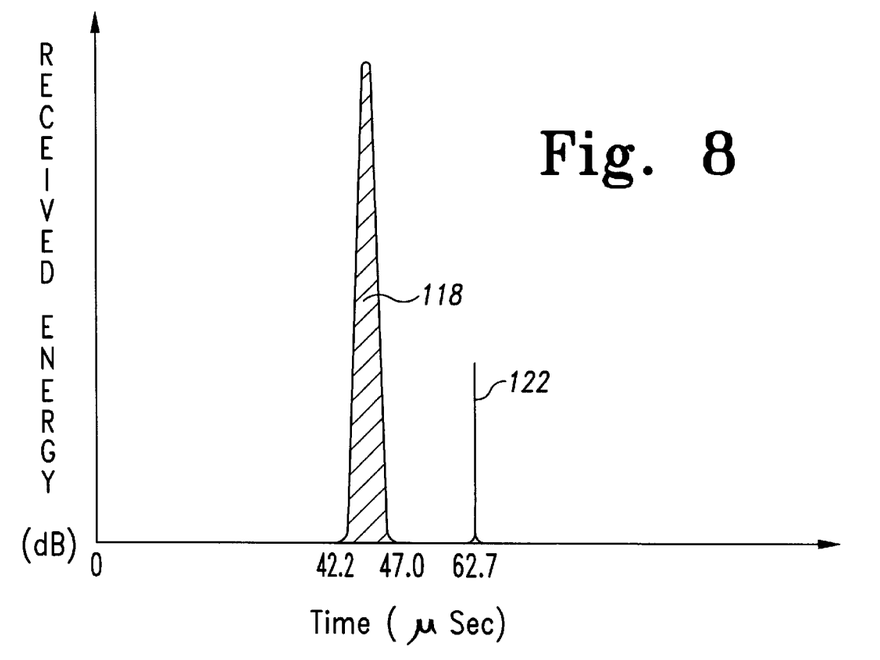
FIG. 8 is a graph similar to FIG. 6, but indicative of when rod of the fluid cylinder assembly of FIG. 2 is aligned with the transducer devices.

In the case of the fluid cylinder assembly 110, piston location is detected by measuring the amount of time in which it takes ultrasonic vibrations to travel between the transmitting transducer device 112 and the receiving transducer device 114. Hence, as shown in FIGS. 6–8, a graphical representation can be created which is indicative of location of the piston 26 or the rod 28. The data in FIGS. 6–8 is indicative of received energy versus time of ultrasonic vibrations transmitted into a fluid cylinder having a side wall thickness of 21.4 mm (i.e. the cylindrical side wall 22), a bore of 107.8 mm, and a rod thickness of 50 mm (i.e. the rod 28). Note that the data is also indicative of use of SAE 10W hydraulic fluid at 150° Fahrenheit.

As shown in FIG. 6, if neither the piston 26 nor the rod 22 is aligned with the transducer devices 112, 114, ultrasonic vibrations are received or otherwise detected by the receiving transducer device 114 at a point in time 90.7 μs subsequent to vibration generation by the transmitting transducer device 112 (peak 116). It should be appreciated that vibrations are also detected by the receiving transducer device 114 during the time period between 42.2 and 47.0 μs subsequent to vibration generation by the transmitting transducer device 112 (curve 118) due to cylinder ring.

As shown in FIG. 7, if the piston 26 is aligned with the transducer devices 112, 114, ultrasonic vibrations are received or otherwise detected by the receiving transducer device 114 at a point in time 29.2 μs subsequent to vibration generation by the transmitting transducer device 112 (peak 120). It should be appreciated that vibrations are also detected by the receiving transducer device 114 during the time period between 42.2 and 47.0 μs subsequent to vibration generation by the transmitting transducer device 112 (curve 118) due to cylinder ring.

Moreover, as shown in FIG. 8, if the rod 26 is aligned with the transducer devices 112, 114, ultrasonic vibrations are received or otherwise detected by the receiving transducer device 114 at a point in time 62.7 μs subsequent to vibration generation by the transmitting transducer device 112 (peak 122). It should be appreciated that vibrations are also detected by the receiving transducer device 114 during the time period between 42.2 and 47.0 μs subsequent to vibration generation by the transmitting transducer device 112 (curve 118) due to cylinder ring.

Industrial Applicability

In operation, in the case of the fluid cylinder assembly 10 of FIG. 1, if the operator of the work machine initiates an automatic lift function with the lift lever 64 of the lever assembly 54, the hydraulic cylinder 12 is actuated so as to cause the rod 28 to be extended out of the housing 16. Such extension of the rod 28 causes the lift arm 46 to be raised relative to the chassis 40. The generator/receiver unit 50 sends a trigger signal to the transducer device 56 thereby causing the transducer device 56 to transmit ultrasonic vibrations into the piston chamber 24. The vibrations travel outwardly from the transducer device 56 and a portion thereof is reflected back or echoed at each steel/hydraulic fluid interface. The transducer device 56 receives the echoes and converts the same into an electrical signal which is sent to the generator/receiver unit 50 via the signal line 58.

The generator/receiver unit 50 filters out background noise and static associated with the received echoes. The generator/receiver unit 50 then digitizes the filtered output of the transducer device 56 for presentation to the controller 52 via the communication line 60. The controller 52 compares the time values of associated with each of the echoes to known values in order to determine if (1) the piston 26 is aligned with the transducer device 56, (2) the rod 28 is aligned with the transducer device 56, or (3) neither the piston 26 nor the rod 28 is aligned with the transducer device 56. If the piston 26 is aligned with the transducer device 56, the controller 52 generates a piston-located control signal on the signal line 62 thereby causing the current to be removed from the electromagnetic coil 98 associated with the lift lever 64. Removal of electrical current from the electromagnetic coil 98 causes the lift lever 64 to be returned to its neutral position thereby placing the lift lever 64 in its deactuated mode of operation which in turn deactuates the hydraulic cylinder 12.

However, if the rod 28 is aligned with the transducer device 56, the controller 52 generates a rod-located control signal on the signal line 62. Generation of the rod-located signal does not remove electrical current from the electromagnetic coil 98 thereby allowing the lift lever 64 to remain in its actuated mode of operation thereby causing the hydraulic cylinder 12 to remain actuated. Moreover, if neither the piston 26 nor the rod 28 is aligned with the transducer device 56, the controller generates a components-absent control signal on the signal line 62. Generation of the components-absent signal prevents electrical current from being applied to the electromagnetic coil 98 thereby preventing the lift lever 64 from being retained in its actuated mode of operation by the electromagnetic coil 98 which in turn requires the lift lever 64 to be manually operated by the operator.

In the case of the fluid cylinder assembly 110 of FIG. 2, if the operator of the work machine initiates an automatic lift function with the lift lever 64 of the lever assembly 54, the hydraulic cylinder 12 is actuated so as to cause the rod 28 to be extended out of the housing 16. Such extension of the rod 28 causes the lift arm 46 to be raised relative to the chassis 40. The generator/receiver unit 50 sends a trigger signal to the transducer device 112 via the signal line 126 thereby causing the transducer device 112 to transmit ultrasonic vibrations into the piston chamber 24. The vibrations travel outwardly from the transducer device 112 and a portion thereof is reflected or dissipated at each steel/hydraulic fluid interface. Non-reflected vibrations are received by the transducer device 114 and converted into electrical signals which are sent to the generator/receiver unit 50 via the signal line 128.

The generator/receiver unit 50 filters out background noise and static associated with the received vibrations. The generator/receiver unit 50 then digitizes the filtered output of the transducer device 114 for presentation to the controller 52 via the communication line 60. The controller 52 compares the time values associated with the received vibrations to known values in order to determine if (1) the piston 26 is aligned with the transducer devices 112, 114, (2) the rod 28 is aligned with the transducer devices 112, 114, or (3) neither the piston 26 nor the rod 28 is aligned with the transducer devices 112, 114. If the piston 26 is aligned with the transducer devices 112, 114, the controller 52 generates a piston-located control signal on the signal line 62 thereby causing the current to be removed from the electromagnetic coil 98 associated with the lift lever 64. Removal of electrical current from the electromagnetic coil 98 causes the lift lever 64 to be returned to its neutral position thereby placing the lift lever 64 in its deactuated mode of operation which in turn deactuates the hydraulic cylinder 12.

However, if the rod 28 is aligned with the transducer devices 112, 114, the controller 52 generates a rod-located control signal on the signal line 62. Generation of the rod-located signal does not remove electrical current from the electromagnetic coil 98 thereby allowing the lift lever 64 to remain in its actuated mode of operation thereby causing the hydraulic cylinder 12 to remain actuated. Moreover, if neither the piston 26 nor the rod 28 is aligned with the transducer devices 112, 114, the controller 52 generates a components-absent control signal on the signal line 62. Generation of the components-absent signal prevents electrical current from being applied to the electromagnetic coil 98 thereby preventing the lift lever 64 from being retained in its actuated mode of operation by the electromagnetic coil 98 which in turn requires the lift lever 64 to be manually operated by the operator.

As described above, the fluid cylinder assembly 10, 110 has numerous advantages over fluid cylinder assemblies which have heretofore been designed. For example, the fluid cylinder assembly 10, 110 accurately determines location of the piston 26 irrespective of changes of both the pressure and temperature of the hydraulic fluid within the piston chamber 24. More specifically, changes in both the pressure and temperature of the hydraulic fluid within the piston chamber 24 may disadvantageously vary the rate at which ultrasonic vibrations propagate through the hydraulic fluid thereby producing varying time values associated with either return energy detection (in the case of the fluid cylinder assembly 10) or received energy detection (in the case of the fluid cylinder assembly 110). However, since the ultrasonic vibrations generated by the transducer 48 must traverse only a thin film of hydraulic fluid between the piston 26 and the side wall surfaces 66, 68 when the piston 26 is aligned with the transducer 48, the time values associated with either return energy detection (in the case of the fluid cylinder assembly 10) or received energy detection (in the case of the fluid cylinder assembly 110) are virtually unaffected by changes in both the pressure and temperature of the hydraulic fluid within the piston chamber 24.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

What is claimed is:

1. A fluid cylinder assembly for a work machine having a first machine component and a second machine component, comprising:

a fluid cylinder including (i) a housing having a first end wall, a second end wall, and a cylindrical side wall which collectively cooperate so as to define a piston chamber, said housing being secured to said first machine component, (ii) a piston housed for translation within said piston chamber, and (iii) a rod which extends through an opening defined in said second end wall, said rod having a first rod end which is secured to said piston, and a second rod end which is secured to said second machine component;

an ultrasonic transducer secured to said cylindrical side wall of said fluid cylinder for transmitting ultrasonic vibrations into said piston chamber during a first time period and receiving ultrasonic vibrations from said piston chamber during a second time period, said ultrasonic transducer being secured to said cylindrical sidewall such that a line ($l_1$) which (i) extends through said ultrasonic transducer and said piston chamber and (ii) is positioned substantially perpendicular to said cylindrical sidewall, periodically intersects either said piston or said rod as said piston translates within said piston chamber; and a circuit which is operatively coupled to said ultrasonic transducer, wherein said circuit (i) generates a trigger signal which causes said ultrasonic transducer to transmit said ultrasonic vibrations during said first time period, and (ii) generates a piston-located signal in response to receipt of said ultrasonic vibrations from said ultrasonic transducer when said piston has a predetermined physical relationship with said ultrasonic transducer.

2. The fluid cylinder assembly of claim 1, wherein said circuit generates a rod-located signal in response to receipt of said ultrasonic vibrations from said ultrasonic transducer when said rod has said predetermined physical relationship with said ultrasonic transducer.

3. The fluid cylinder assembly of claim 1, wherein said circuit generates a components-absent signal in response to receipt of said ultrasonic vibrations from said ultrasonic transducer when neither said piston nor said rod have said predetermined physical relationship with said ultrasonic transducer.

4. The fluid cylinder assembly of claim 1, further comprising a lever assembly electrically coupled to said circuit, wherein:

said lever assembly has an actuated mode of operation and a deactuated mode of operation, said fluid cylinder is actuated when said lever assembly is positioned in said actuated mode of operation, said fluid cylinder is deactuated when said lever assembly is positioned in said deactuated mode of operation, and generation of said piston-located signal causes said lever assembly to be switched from said actuated mode of operation to said deactuated mode of operation.

5. The fluid cylinder assembly of claim 4, wherein:
said circuit generates a rod-located signal in response to receipt of said ultrasonic vibrations from said ultrasonic transducer when said rod has said predetermined physical relationship with said ultrasonic transducer, and
said lever assembly is maintained in said actuated mode of operation in response to generation of said rod-located signal.

6. The fluid cylinder assembly of claim 4, wherein:
said lever assembly includes a retaining device for selectively retaining said lever assembly in said actuated mode of operation,
said circuit generates a components-absent signal in response to receipt of said ultrasonic vibrations from said ultrasonic transducer when neither said piston nor said rod have said predetermined physical relationship with said ultrasonic transducer, and
said retaining device is prevented from retaining said lever assembly in said actuated mode of operation in response to generation of said components-absent signal.

7. The fluid cylinder assembly of claim 1, wherein said ultrasonic transducer includes a single transducer device which (i) transmits said ultrasonic vibrations into said piston chamber during said first time period, and (ii) receives said ultrasonic vibrations from said piston chamber during said second time period.

8. The fluid cylinder assembly of claim 1, wherein said ultrasonic transducer includes a first transducer device located on a first portion of said cylindrical side wall which transmits said ultrasonic vibrations into said piston chamber during said first time period, and a second transducer device located on a second portion of said cylindrical side wall which receives said ultrasonic vibrations from said piston chamber during said second time period.

9. The fluid cylinder assembly of claim 1, wherein:
said first machine component includes a chassis,
said first end wall of said fluid cylinder housing is secured to said chassis,
said second machine component includes a lift arm which is pivotally secured to said chassis, and
said second rod end of said rod is secured to said lift arm, whereby said lift arm is moved relative to said chassis in response to actuation of said fluid cylinder.

10. A method of detecting piston location within a fluid cylinder assembly of a work machine having a first machine component and a second machine component, with the fluid cylinder assembly having a fluid cylinder which includes (i) a housing having a first end wall, a second end wall, and a cylindrical side wall which collectively cooperate so as to define a piston chamber, the housing being secured to the first machine component, (ii) a piston housed for translation within the piston chamber, and (iii) a rod which extends through an opening defined in the second end wall, the rod having a first rod end which is secured to the piston, and a second rod end which is secured to the second machine component, comprising the steps of:
securing an ultrasonic transducer to said cylindrical sidewall such that a line ($l_1$) which (i) extends through said ultrasonic transducer and said piston chamber and (ii) is positioned substantially perpendicular to said cylindrical sidewall, periodically intersects either said piston or said rod as said piston translates within said piston chamber;
transmitting ultrasonic vibrations into the piston chamber with said ultrasonic transducer which is secured to the cylindrical side wall of the fluid cylinder during a first time period;
receiving ultrasonic vibrations from the piston chamber with the ultrasonic transducer during a second time period; and
generating a piston-located signal when the ultrasonic vibrations received by the ultrasonic transducer indicate that the piston has a predetermined physical relationship with the ultrasonic transducer.

11. The method of claim 10, further comprising the step of generating a rod-located signal when the ultrasonic vibrations received by the ultrasonic transducer indicate that the rod has said predetermined physical relationship with the ultrasonic transducer.

12. The method of claim 10, further comprising the step of generating a components-absent signal when the ultrasonic vibrations received by the ultrasonic transducer indicate that neither the piston nor the rod has said predetermined physical relationship with the ultrasonic transducer.

13. The method of claim 10, wherein the fluid cylinder assembly further has a lever assembly which controls the fluid cylinder, further comprising the step of:
placing the lever assembly in a deactuated mode of operation so as to deactuate the fluid cylinder in response to generation of the piston-located signal.

14. The method of claim 13, further comprising the steps of:
generating a rod-located signal when the ultrasonic vibrations received by the ultrasonic transducer indicate that the rod has said predetermined physical relationship with the ultrasonic transducer; and
maintaining the lever assembly in an actuated mode of operation so as to actuate the fluid cylinder in response to generation of the rod-located signal.

15. The method of claim 13, wherein the lever assembly includes a retaining device for selectively retaining the lever assembly in an actuated mode of operation so as to actuate the fluid cylinder, further comprising the steps of:
generating a components-absent signal when the ultrasonic vibrations received by the ultrasonic transducer indicate that neither the piston nor the rod has said predetermined physical relationship with the ultrasonic transducer; and
preventing the lever assembly from being retained in the actuated mode of operation by the retaining device in response to generation of the components-absent signal.

16. The method of claim 10, wherein:
the ultrasonic transducer includes a single transducer device,
the transmitting step includes the step of transmitting the ultrasonic vibrations into the piston chamber during the first time period with the single transducer device, and
the receiving step includes the step of receiving the ultrasonic vibrations from the piston chamber during the second time period with the single transducer device.

17. The method of claim 10, wherein:
the ultrasonic transducer includes a first transducer device located on a first portion of the cylindrical side wall and a second transducer device located on a second portion of the cylindrical side wall,
the transmitting step includes the step of transmitting the ultrasonic vibrations into the piston chamber during the first time period with the first transducer device,
the receiving step includes the step of receiving the ultrasonic vibrations from the piston chamber during the second time period with the second transducer device, and the first transducer device is distinct from the second transducer device.

18. A fluid cylinder assembly for a work machine having a first machine component and a second machine component, comprising:

a fluid cylinder including (i) a housing having a first end wall, a second end wall, and a cylindrical side wall which collectively cooperate so as to define a piston chamber, said housing being secured to said first machine component, (ii) a piston housed for translation within said piston chamber, and (iii) a rod which extends through an opening defined in said second end wall, said rod having a first rod end which is secured to said piston, and a second rod end which is secured to said second machine component;

an ultrasonic transducer secured to said cylindrical side wall of said fluid cylinder for transmitting ultrasonic vibrations into said piston chamber during a first time period and receiving ultrasonic vibrations from said piston chamber during a second time period, said ultrasonic transducer being secured to said cylindrical sidewall such that a line ($l_1$) which (i) extends through said ultrasonic transducer and said piston chamber and (ii) is positioned substantially perpendicular to said cylindrical sidewall, periodically intersects either said piston or said rod as said piston translates within said piston chamber; and a circuit which is operatively coupled to said ultrasonic transducer, wherein said circuit (i) generates a trigger signal which causes said ultrasonic transducer to transmit said ultrasonic vibrations during said first time period, and (ii) generates a rod-located signal in response to receipt of said ultrasonic vibrations from said ultrasonic transducer when said rod has a predetermined physical relationship with said ultrasonic transducer.

* * * * *